(No Model.)

C. LA DOW.
HARROW.

No. 415,113. Patented Nov. 12, 1889.

Witnesses:
Edward C. Davidson
Lloyd B. Wight

Charles La Dow, Inventor.
by his attorneys Baldwin & Davidson

UNITED STATES PATENT OFFICE.

CHARLES LA DOW, OF ALBANY, NEW YORK.

HARROW.

SPECIFICATION forming part of Letters Patent No. 415,113, dated November 12, 1889.

Application filed August 22, 1887. Serial No. 247,549. (No model.)

*To all whom it may concern:*

Be it known that I, CHARLES LA DOW, of Albany, in the State of New York, have invented certain new and useful Improvements in Harrows, of which the following is a specification.

The organization, operation, and subject-matter claimed are fully set forth below.

Figure 1:
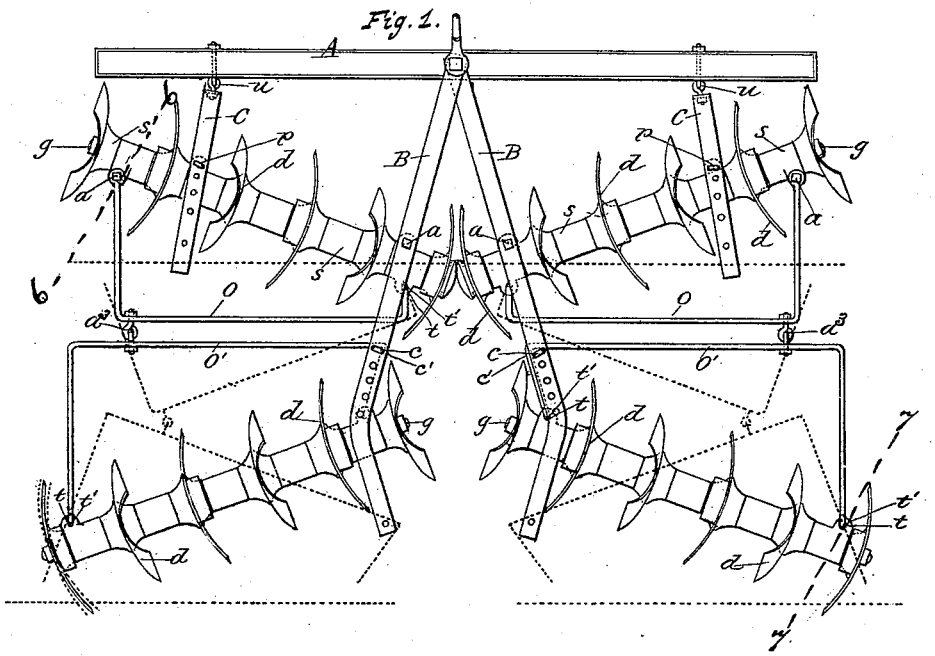
Figure 2:
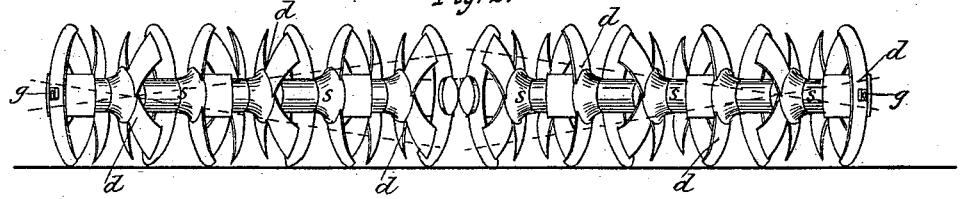
Figures 3, 5:
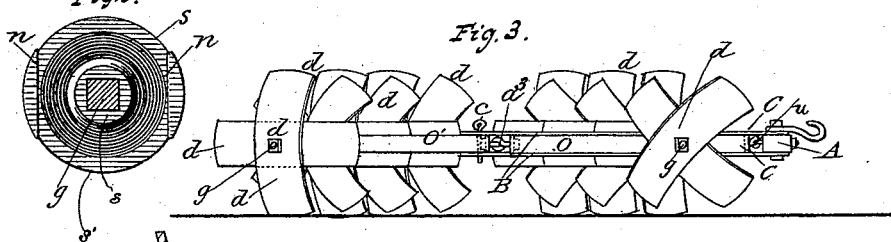
Figures 4, 6, 7:
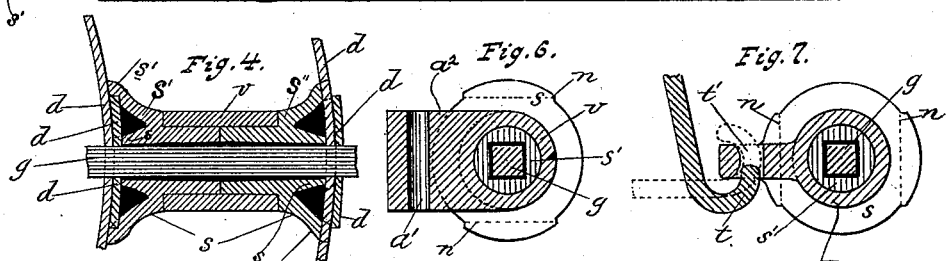

In the drawings, Figure 1 is a plan view; Fig. 2, a rear elevation; Fig. 3, a side elevation. Fig. 4 is a detail sectional view through the thimble or device for spacing the cutters on the shaft or gang-axle; Fig. 5, an end view of such a thimble, showing the square gang-axle in section. Fig. 6 is a section through a gang on the line 6 6 of Fig. 1, and Fig. 7 is a similar section on the line 7 7 of Fig. 1.

Each gang of cutters is shown as made up of a gang-axle, cutting-teeth, and spacing thimbles or spools. The axle $g$ is square and passes through correspondingly-shaped openings in the teeth $d$ and spools S. The spools may be made in one piece, as indicated in the general views, or in sections $S'$ $S''$, as shown in Fig. 4, and preferably have their ends shaped to conform to the teeth $d$. The teeth shown being curved and all those in a gang set in the same direction, the end faces of the spools are, as shown, made concave on one end and convex on the other. The ends of the spools are preferably constructed, as shown in Figs. 4 and 5, with a central hub $s$, through which the gang-shaft passes, an outer-flaring rim $s'$, and an annular recess or space between the rim and hub, indicated by the black spaces in Fig. 4. This construction is light and strong, and serves to firmly support the teeth at the middle and on each side.

The teeth which I employ are concave-plate spring-teeth of the general shape shown in the drawings, and are preferably clamped in the following manner: Each end of a spool is formed with opposite parallel lugs $n$ on the rim $s'$, those on one end being arranged at right angles to those on the other, and the teeth fit snugly between them. The teeth are arranged in pairs, those in each pair preferably at right angles to each other, and each tooth is of course held against turning by the square shaft and the parallel lugs between which it lies. The lugs on the ends of the spools may be omitted. The gang being assembled, the cutters in each gang are clamped so as to revolve together by means of the nut on the end of the gang-shaft. The clamping increases the vibration of the teeth, so that clogging matter is thrown off more than if one cutter or one pair or cutters revolved independently of other cutters in the same gang.

So far as I am aware I am the first to use rotary spring-teeth, whether they be concave or not, in gangs which may be angled relatively to the draft-line, and also the first to clamp a spring cutter or cutters to other cutters in the same gang by means of intermediate spools, so that the cutters so clamped must rotate in concert, but may have spring vibration independently of each other.

The spring action of the teeth throws clogging matter out of the concave sides of the cutters. Of course the gang-shaft might be stationary and the cutters revolve around it, either separately or as a gang, and such cutters, as above described, may of course be arranged in a variety of ways. Four gangs are shown arranged in pairs—one pair in front of the other—with the gangs in each pair on the opposite sides of the central draft-line, and preferably radiating outward from one center, like four spokes in a wagon-wheel. The leading gangs have their cutters disposed to throw the earth from the center of the machine, their inner ends being preferably in contact and provided with buffer-heads to take the end-thrust, as is well understood. The cutters of the rear gangs are arranged to throw the earth toward the center of the machine, and consequently the furrow left between the inner cutters of the leading gangs is filled by the following gangs and the earth left in smooth and even condition.

The draft and adjusting devices may be arranged as follows: A transverse draft-beam A, which also serves as a guard-bar to protect the horses, is connected with the inner ends of the gang-beams by draft-rods B B, which are pivoted to the center of the beam A and, diverging, extend rearwardly, and are connected with the leading gangs between the two inner cutters of each gang by bolts $a$, which pass through the bar and through an aperture $a'$ in a lug $a^2$, formed on one side of the sleeve $v$, which envelops the thimble S, Figs. 1, 4, and 6. The leading gangs are also connected with the beam A toward their outer ends by draft-links C, pivotally connected with the bar A by hinge-joints $u$, which permit both vertical and horizontal movement, and provided with series of apertures and locking pins or bolts $p$, which connect with the gangs in the same manner as just described and permit adjustment, so that the gangs may be set at an angle relatively to the draft-lines. To the rear of each leading gang a triangularly-shaped yoke O is connected. One end of each yoke is connected with the outer end of the gang by a pin $a$, which engages the gang in the same manner described in connection with the rods B B, and as shown in Fig. 6. The other end of the yoke is preferably formed with an upwardly-curved hook $t$, which engages an aperture $t'$ in a lug on a sleeve T between the two inner cutters of the gang. (See Fig. 7.) The rear gangs are equipped with similar angular yokes O', which may be connected with both the inner and outer portions of the gangs by hook-connections $t\,t$, same as just described. The yokes O O' are preferably so related to the gangs that when the gangs are in the angular working position shown the long sides of the yokes of the front and rear gangs will be about parallel and about at right angles to the draft-line. Each pair of yokes O O' is connected by a universal-hinge connection $a^3$, which is preferably located, as shown, near the outer edges of the machine and near the angles of the yokes.

The diverging draft-bars B B extend rearwardly beyond the leading gangs, are curved inwardly somewhat toward their ends, and are provided with series of apertures for the reception of locking-pins $c$, which engage the inner angle $c'$ of the yokes O O'. Other forms of draft-frames may be substituted.

As indicated in the side elevation, Fig. 3, the bars B B and C C may be double or bifurcated and pass above and below the gang-thimbles and the yokes, and be provided with corresponding apertures both above and below to insure a secure connection when the pins $a$ are dropped in place.

In the drawings the gangs are shown in full lines set at a working angle to the draft-line, while the dotted lines indicate the position the yokes would assume when the gangs are set at right angles to the draft.

From the above description it will be perceived that this harrow has four gangs, and that the right and left hand gangs on each side of the central draft-line are attached together, thus forming a section which may vibrate vertically independently of the opposite section, and in which the end-thrust of one gang in each section is counteracted by that of its mate. Thus the gangs always cut level and leave the soil in a smooth and uniform condition.

By withdrawing the pins $a$ the draft of the team throws the gangs out of their angular working position into the position shown by the dotted lines, while the adjustment of the angle of the gangs is readily accomplished by setting the pins in the proper holes. The angular adjustment of the gangs may be omitted or the manner of accomplishing it be varied. It will be observed that the frame is supported solely by the cutters. The frame therefore not only holds the cutters in position, but also enforces their action.

In Letters Patent No. 388,567, August 28, 1888, I have shown a machine like that herein described, said patent being a division of this application, and I disclaim herein any subject-matter claimed in that patent.

I claim as my invention—

1. A self-rotating plate-spring harrow-tooth formed with substantially like ends and adapted to be mounted on a support arranged at an angle to the line of draft, so that it may be caused to cut into the soil and turn a furrow.

2. The combination of a gang-shaft set at an angle to the line of draft and plate-spring harrow-teeth mounted thereon with their edges toward the soil, so as to constitute a rotary gang of spring harrow-teeth which cut through the soil edgewise and turn the earth.

3. The combination of a gang-shaft, spools, and concave spring harrow-teeth clamped between the spools and adapted to be set at an angle to the line of draft.

4. The combination of concave plate-spring harrow-teeth and a rotatable support upon which they are mounted, said support being set at an angle to the line of draft, substantially as set forth.

5. The combination of the concave or curved cutting-teeth, the gang-shaft, and the spools formed with one end concave and the opposite end convex.

6. A revolving harrow-tooth composed of a bar or bars of spring metal adapted to vibrate laterally as the implement proceeds, said vibration being caused by the pressure of the earth against the concave side of the tooth, in combination with a support for maintaining said revolving tooth at an angle to the line of draft.

In testimony whereof I have hereunto subscribed my name.

CHARLES LA DOW.

Witnesses:
  HARRY HATTON,
  FRANK E. BROWN.